United States Patent
Wu

(10) Patent No.: US 8,868,967 B2
(45) Date of Patent: Oct. 21, 2014

(54) METHOD AND SYSTEM FOR CONNECTION-ERROR HANDLING OF SERVICE IN AN AUTOMATICALLY SWITCHED OPTICAL NETWORK

(75) Inventor: Jianhong Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 321 days.

(21) Appl. No.: 13/258,406

(22) PCT Filed: Mar. 23, 2010

(86) PCT No.: PCT/CN2010/071238
§ 371 (c)(1),
(2), (4) Date: Sep. 27, 2011

(87) PCT Pub. No.: WO2010/111919
PCT Pub. Date: Oct. 7, 2010

(65) Prior Publication Data
US 2012/0011390 A1  Jan. 12, 2012

(30) Foreign Application Priority Data

Mar. 31, 2009 (CN) .......................... 2009 1 0081403

(51) Int. Cl.
*G06F 11/00* (2006.01)
*H04Q 11/00* (2006.01)
*H04L 12/24* (2006.01)

(52) U.S. Cl.
CPC ........ *H04Q 11/0062* (2013.01); *H04L 41/0663* (2013.01); *H04L 41/0677* (2013.01); *H04Q 2011/0081* (2013.01)
USPC ....................................................... 714/4.2

(58) Field of Classification Search
USPC ................................................... 714/4.2, 48
See application file for complete search history.

(56) References Cited

U.S. PATENT DOCUMENTS 7,415,627 B1  8/2008  Radhakrishnan et al.
8,363,562 B2 *  1/2013  Liu et al. ....................... 370/252
2006/0002705 A1  1/2006  Cline et al.
2006/0109855 A1 *  5/2006  Rodrigo ......................... 370/404
2006/0114818 A1 *  6/2006  Canali et al. .................. 370/216
2006/0215549 A1 *  9/2006  Canali et al. .................. 370/228

(Continued)

FOREIGN PATENT DOCUMENTS

CN  101150444 A  3/2008
CN  101360008 A  2/2009

(Continued)

OTHER PUBLICATIONS

International Search Report in international application No. PCT/CN2010/071238, mailed on Jul. 1, 2010.

(Continued)

*Primary Examiner* — Yair Leibovich
(74) *Attorney, Agent, or Firm* — Oppedahl Patent Law Firm LLC

(57) ABSTRACT

The present invention discloses a method for connection-error handling of service in an Automatically Switched Optical Network (ASON), to resolve the technical problems that the conventional method for connection-error handling cannot realize rapid automatic configuration and the efficiency is low and other problems. Through automatically completing the configuration of the connection-error handling information of the start node and the end node by the control plane, the present invention overcomes the defect that manual setting is error prone; it is rapid and simple to implement the interaction of the error handling information between the start node and the end node by protocol exchange. Because the present invention can automatically complete the configuration of the connection-error handling information of the start node and the end node by the control plane, and can cite, when a connection error alarm occurs, the error prevent information of the original connection over a new connection of the service under the conditions of different error handling policies, the present invention enhances the system availability and the service robustness to a great extent.

8 Claims, 9 Drawing Sheets

(56) References Cited

U.S. PATENT DOCUMENTS

| | | | |
|---|---|---|---|
| 2006/0262728 A1* | 11/2006 | Addeo et al. | 370/248 |
| 2007/0019745 A1* | 1/2007 | Donadio et al. | 375/259 |
| 2008/0240710 A1 | 10/2008 | Nishioka | |
| 2009/0310960 A1* | 12/2009 | Xu | 398/4 |
| 2010/0054731 A1* | 3/2010 | Oltman et al. | 398/1 |
| 2012/0106950 A1* | 5/2012 | Madrahalli et al. | 398/25 |

FOREIGN PATENT DOCUMENTS

| | | |
|---|---|---|
| CN | 101515827 A | 8/2009 |
| EP | 1531633 A1 | 5/2005 |
| EP | 1727316 A1 | 11/2006 |
| GB | 2424550 A | 9/2006 |
| RU | 2227374 C2 | 4/2004 |

OTHER PUBLICATIONS

English Translation of the Written Opinion of the International Search Authority in international application No. PCT/CN2010/071238, mailed on Jul. 1, 2010.

* cited by examiner

METHOD AND SYSTEM FOR CONNECTION-ERROR HANDLING OF SERVICE IN AN AUTOMATICALLY SWITCHED OPTICAL NETWORK

TECHNICAL FIELD

The present invention relates to the field of optical communications, and in particular relates to a method and system for connection-error handling of service in an Automatically Switched Optical Network (ASON).

BACKGROUND

With the development of network technology and substantial increase of network communication capacity, the demands on the performance of a transport network become increasingly higher, through imparting intelligent attributes to an optical network by means of adding an automatically controlled protocol in the optical domain, it is expected to make the network architecture more flexible, the network management flexible and uniform, bandwidth utilization ratio higher, survivability and expansibility stronger, and make the network be capable of providing dynamic connection and intelligent scheduling, thus an Automatically Switched Optical Network (ASON) is developed to satisfy the above demands.

The ASON consists of a control plane, a transport plane, a Data Communication Network (DCN) and a management plane.

The ASON embodies functional separation of the control plane from the transport plane, wherein the control plane is responsible for establishing connections in the transport plane through a signaling routing mechanism and performing re-routing recovery when the connection fails, while the transport plane is responsible for service transmission and failure detection. The DCN is responsible for the transmission of the signaling routing messages in the control plane. The management plane is responsible for performing configuration management of the control plane and the transport plane.

Under the condition that the service routing in the ASON is provided by a multiplex section shared protection ring, a node failure or a multi-span section failure in the multiplex section shared protection ring may result in the occurrence of service error connection. At this moment, the transport plane is required to prevent error by configuring path error handling information, e.g. preventing error through a Trace Identification Mismatch (TIM) alarm generated by a path trace byte (Jx byte). In this way, the control plane may take subsequent measures (e.g. re-routing) according to the actual failure state of the service. To make it brief, "configure Jx bytes" and "configure error handling information" have the same meaning herein.

The control plane realizes automatic configuration based on the technology of connection-error handling of the transport plane. Currently, error handling is performed through configuring a Jx byte alarm in the transport plane connection-error handling technology.

In the conventional method for connection-error handling, configuration is performed by the management plane in the transport plane, thus the efficiency is low and rapid automatic configuration cannot be realized. For example, when recovery occurs in the service, if this case is reported to the management plane and then a Jx byte is set, the recovery time cannot be ensured, which makes the recovery meaningless. Thus, it is required to configure the Jx byte in time so as to guarantee normality of the service. It is essential to realize a rapid, automatic and safe configuration in the ASON. However, currently there is a lack of technologies related to connection-error handling in the field of ASON

SUMMARY OF THE INVENTION

In view of the problem above, one of the main objectives of the prevent invention is to provide a method for connection-error handling of service in an ASON, to solve the technical problems that the conventional methods for connection-error handling cannot realize rapid automatic configuration and the efficiency is low and other problems. In order to achieve the above objective, the technical solution of the present invention is realized by the following way.

A method for connection-error handling of service in an ASON comprises step A: a control plane configures service error handling information for a transport plane;

step B: the transport plane reports connection error alarm information to the control plane after detecting an connection error according to the service error handling information;

step C; the control plane acquires, after receiving the connection error alarm information, an error handling policy of a service in which an connection error alarm is generated, and performs a corresponding error handling operation.

Further, the step that the control plane configures the service error handling information for the transport plane may comprise:

step A1: the control plane of a start node or an end node of a service issues a configuration request to the transport plane of the corresponding node after acquiring the service error handling information;

step A2: the start node or the end node of the service that initiates an operation of configuring service error handling information sends the service error handling information to an opposite node of the service;

step A3: the opposite node of the service issues a configuration request to the transport plane of the opposite node of the service after receiving the service error handling information;

step A4: the start node and end node of the service, after being successfully configured with the service error handling information, report configuration success messages to the control plane;

Further, the service error handling information may refer to a path trace byte, the control plane may need to set a sending value and an expected value when configuring the path trace byte, the setting method may comprise:

for a one-way service, the sending value is set in a sending direction of the start node of the service, and the expected value is set in a receiving direction of the end node of the service; where, sending value is the same as the expected value;

For a two-way service, the sending value is set in the sending directions of the start node and the end node of the service; the expected value is set in the receiving directions of the start node and the end node of the service; where, sending value is the same as the expected value;

Further, the start node or the end node of the service that initiates configuration of the service error handling information may use a Notify message in an RSVP or an OEM message in an LMP to bear the service error handling information and send the message to the opposite node of the service.

Further, the error handling policy may be a re-routing recovery policy and the step C may specifically comprise:

step C11: the control plane searches for a service in which an connection error alarm is generated, according to the connection error alarm information reported by the transport plane;

step C12: the control plane acquires the error handling policy of the service in which the connection error alarm is generated and establishes a recovery connection;

step C13: the control plane configures the service error handling information for the transport plane on the recovery connection according to the service error handling information of an original connection;

step C14: the service in which the connection error alarm is generated is switched from the original connection to the recovery connection after the error handling information of the recovery connection is successfully configured.

Further, the error handing policy may be a protection switching policy and the step C may specifically comprise:

step C21: the control plane searches for a service in which an connection error alarm is generated according to the connection error alarm information reported by the transport plane, and determines a destination connection to which the service needs to be switched to;

step C22: the control plane acquires the error handling policy of the service in which the connection error alarm is generated;

step C23: the control plane configures the service error handling information of the original connection on the destination connection;

step C24: the service in which the connection error alarm is generated is switched from the original connection to the destination connection after the error handling information of the destination connection is successfully configured.

Another objective of the present invention is to provide a system for connection-error handling of service in an ASON. In order to achieve the above objective, a technical solution of the present invention is implemented in the following way.

A system for connection-error handling of service in an ASON comprises:

an error handling information configuring module, arranged to configure service error handling information for an connection error detecting and alarming module located in a transport plane;

the connection error detecting and alarming module, arranged to detect an connection error in a service according to the service error handling information configured by the error handling information configuring module, and inform, after an connection error is detected, an error handling policy executing module located in a control plane;

the error handling policy executing module, arranged to acquire, after receiving connection error alarm information reported by the connection error detecting and alarming module, an error handling policy of the service in which an connection error alarm is generated and execute a corresponding error handling operation.

Further, the error handling information configuring module may be located in the control plane, and may comprise:

a service start node error handling information configuring module, arranged to configure service error handling information for the transport plane at a service start node;

a service end node error handling information configuring module, arranged to configure service error handling information for the transport plane at the service end node;

the service start node error handling information configuring module or the service end node error handling information configuring module, after initiating an operation of configuring service error handling information, may need to send the service error handling information to an opposite node of the service, and the opposite node of the service, after receiving the service error prevent information, may configure the service error handling information for the transport plane of the opposite node of the service.

Further, the service error handling information may refer to a path trace byte, the control plane, when configuring the path trace byte, needs to set a sending value in the sending directions of the start node and the end node of the service and set an expected value in the receiving directions;

the start node or the end node of the service that initiates configuration of the service error handling information may use a Notify message in an RSVP or an OEM message in an LMP to bear the service error handling information and send the message to the opposite node of the service.

Further, the error handling policy executing module may comprise:

a failing service determining unit, arranged to determine a service that fails according to the service connection error alarm information of the service reported by the connection error detecting and alarming module;

a policy acquiring unit, arranged to acquire an error handling policy from service-related information of the service according to the service determined by the failing service determining unit;

a policy executing unit, arranged to execute a corresponding error handling operation according to the error handling policy acquired by the policy acquiring unit;

the error handling policy may be a re-routing recovery policy or a protection switching policy.

Through automatically completing the configuration of the error handling connection-error handling information of the start node and the end node by the control plane, the present invention overcomes the defect that manual setting is error prone, it is rapid and simple to implement the interaction of the error handling information between the start node and the end node by protocol exchange. Because the present invention can automatically complete the configuration of the connection-error handling information of the start node and the end node by the control plane, and can cite, when an connection errors-alarm occurs the error handling information of the original connection over a new connection of the service under the conditions of different error handling policies, therefore, the present invention enhances the system availability and the service robustness to a great extent.

DETAILED DESCRIPTION OF THE INVENTION

The present invention, through automatically completing configuration of connection-error handling information of the start node and the end node of the service by the control plane, can implement error handling of the service and rapidly recover the service to be normal when an connection error occurs in the service, wherein establishment of the service, re-routing recovery of the service, switching of the service and determining of connection error alarm information are all performed by the control plane of the ASON, while connection error detection is performed by the transport plane.

Embodiment 1

Figure 1:
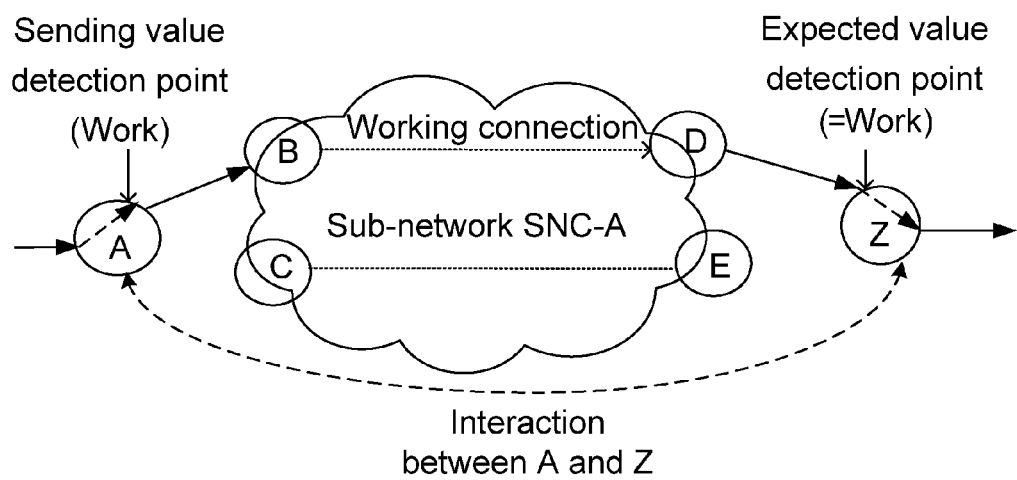
FIG. 1 shows a diagram of an application scenario of a method for connection-error handling in a normal condition according to Embodiment 1 of the present invention.

FIG. 1 shows a diagram of an application scenario of a method for connection-error handling in a normal condition according to a preferred embodiment of the present invention. The Mesh network consists of network elements A, B, C, D, E, Z and a sub-network SNC-A and the links between these nodes, wherein the solid line connection between the network element A and the network element B, and the solid line connection between the network element D and the network element Z are link connections, and the dotted line connection between the network element B and the network element D, and the dotted line connection between the network element C and the network element E are sub-network connections (the graphic symbols in FIG. 1, FIG. 2, FIG. 5 and FIG. 6 are the same and will not be repeated hereinafter). The ASON control plane has established an one-way service connections A-B-D-Z (also called original connections), with the start node of the connection being A, and the end node of the connection being Z. In this embodiment, the error handling policy of the service between A and Z employs a re-routing recovery policy, i.e., the service connection between A and Z has a recovery level, so that when the connection fails, the service may be switched to a recovery connection by establishing the recovery connection. The service connection between A and Z employs a "return" method. In case of failure of the original connection, after the service is switched to the recovery connection by establishing the recovery connection, if the failure of the original connection disappears, the service will be switched back to the original connection.

In the embodiments of the present invention, in the technology of detecting an connection error by the transport plane, the Jx byte-based method for connection-error handling of the service is employed. Therefore, the service error handling information in the embodiment refers to the Jx byte. Of course, other detection methods may also be applied. In the present invention, establishment of the service, re-routing recovery of the service, switching of the service and determining of the connection error alarm information are all performed by the ASON control plane, while connection error detection is performed by the transport plane.

The present invention is characterized in that the configuration of service error handling information of the start node and end node of the service is automatically completed by the control plane; the node that initiates configuration of the service error handling information may be the start node or the end node of the service; the node that initiates the configuration needs to send the service error handling information to the opposite node of the service (the opposite node of the service refers to a counterpart service node of the service node that initiates the configuration; if the start node of the service initiates the configuration process; then the opposite node of the service is the end node of the service); the start node and end node of the service respectively issue a configuration request to their respective transport planes to configure the service error handling information on the start node and end node of the service.

The service error handling information can only be valid after being successfully configured on both the start node and the end node. The process of synchronously configuring the service error handling information and reporting the configuration result between the start node and the end node of the service comprises the following steps:

(1) the control plane of a start node or an end node of the service issues a configuration request to the corresponding node after acquiring the service error handling information;

(2) The start node or end node of the service that initiates the configuration of the service error handling information sends the service error handling information to the opposite node of the service;

the service error handling information only refers to the interaction between the start node and the end node. In order to ensure automatic and rapid configuration of the start node and end node, a certain protocol is needed to be as a support, but it is not limited to using which private signaling and protocol. e.g., a Notify message in the Resource ReSerVation Protocol (RSVP), or an OEM message in the Link Management Protocol (LMP);

(3) The opposite node of the service issues a configuration request to the transport plane of the opposite node of the service after receiving the service error handling information, (4) The start node and the end node of the service report a configuration success message to the control plane after the service error handling information is successfully configured on both the start node and the end node.

Figure 3:
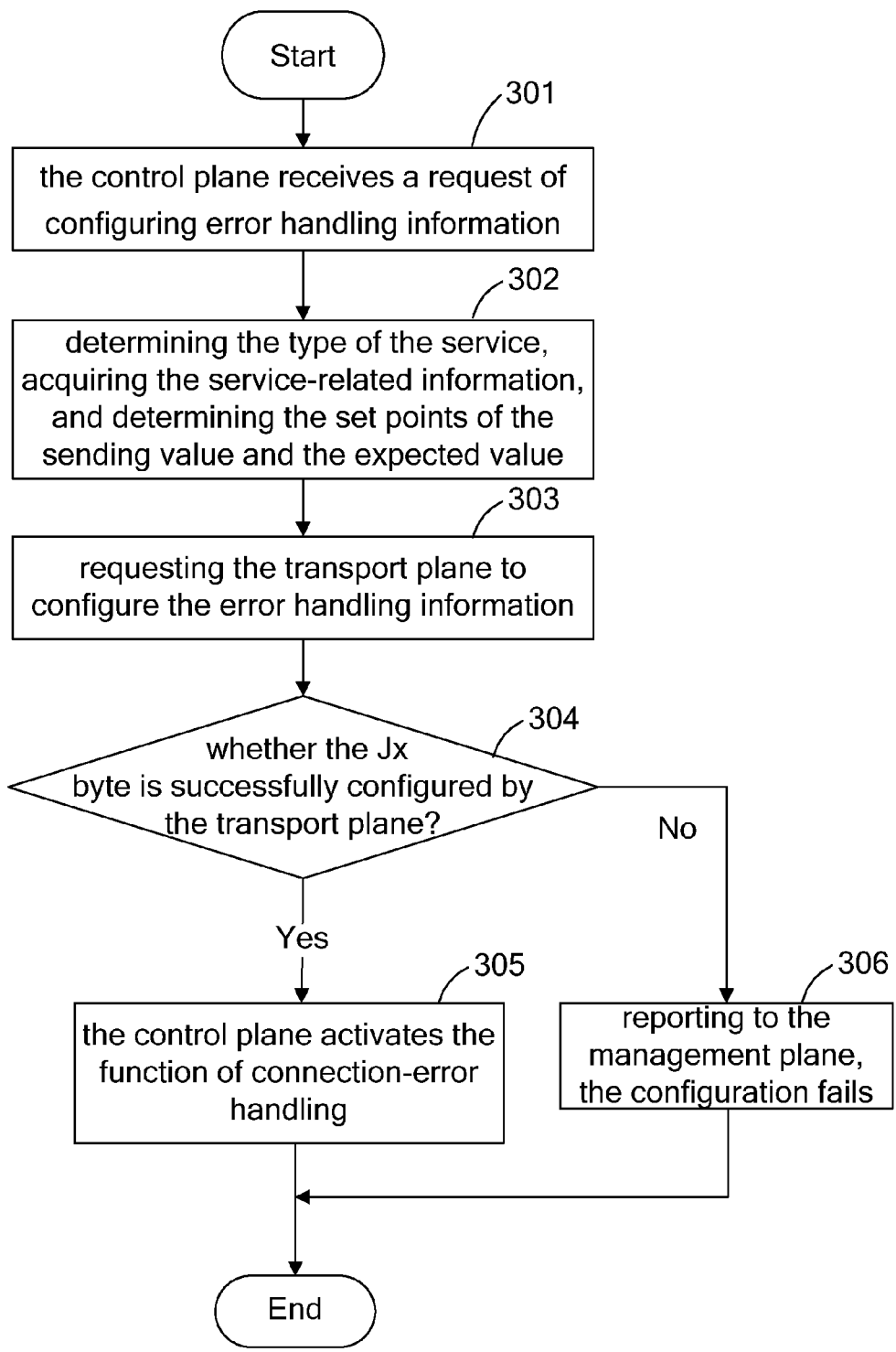
FIG. 3 shows a flow of configuring error handling information by a control plane when the service works normally according to Embodiment 1 of the present invention.

FIG. 3 shows a flow of configuring error handling information by the control plane when the service works normally. The flow is the process in which the service node executes the configuration of error handling information at the service node after receiving the request of configuring the service error handling information, the flow specifically comprises:

step 301: the control plane receives a request of configuring service error handling information;

the service error handling information may be provided by the management plane or automatically generated by the transport plane according to a certain policy;

step 302: the control plane determines the type of the service, acquires the service-related information, and determines the set points of the sending value and the expected value;

step 303: the transport plane is requested to configure the service error handling information;

the transport plane sets the service error handling information at set points of the sending value and the expected value according to the set points of the sending value and the expected value which are determined by the control plane;

for a one-way service, the sending value is set in the sending direction of the start node of the service, and the expected value is set in the receiving direction of the end node of the service; where, the sending value is the same as the expected value;

for a two-way service, the sending value is set in the sending directions of both the start node and end node of the service; the expected value is set in the receiving directions of both the start node and end node of the service; where, the sending value is the same as the expected value;

if the sending value is set, the expected value may not be set. However, if the expected value is set, the corresponding sending value must be set.

Referring to FIG. 1, the step of configuring error handling information on the start node A and end node B of the service comprises:

step 1: the sending value of the path trace byte (Jx byte) is set as Work in the sending direction of the node A;

step 2: the expected value of the path trace byte (Jx byte) is set as Work in the receiving direction of the node Z;

step 3: the service error handling information is successfully configured after the node A receives a response of, successful configuration from the node A and the node Z;

step 304: it is determined whether the transport plane successfully configures the Jx byte, if so, the step 305 is executed; otherwise, the step 306 is executed;

step 305: the control plane activates the function of the connection-error handling;

Step 306: reporting to the management plane, the configuration fails.

Figure 2:
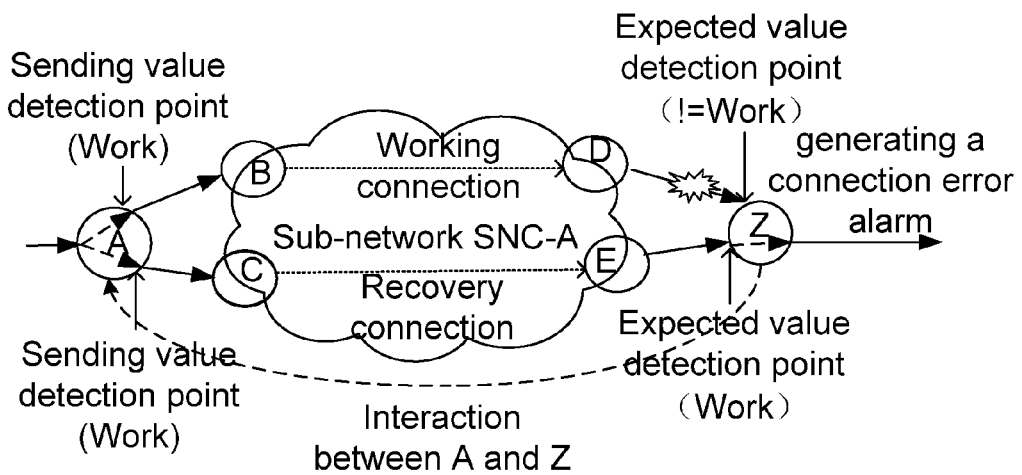
FIG. 2 shows a schematic diagram of establishing a recovery connection when an connection error occurs in the service according to Embodiment 1 of the present invention.
Figure 4:
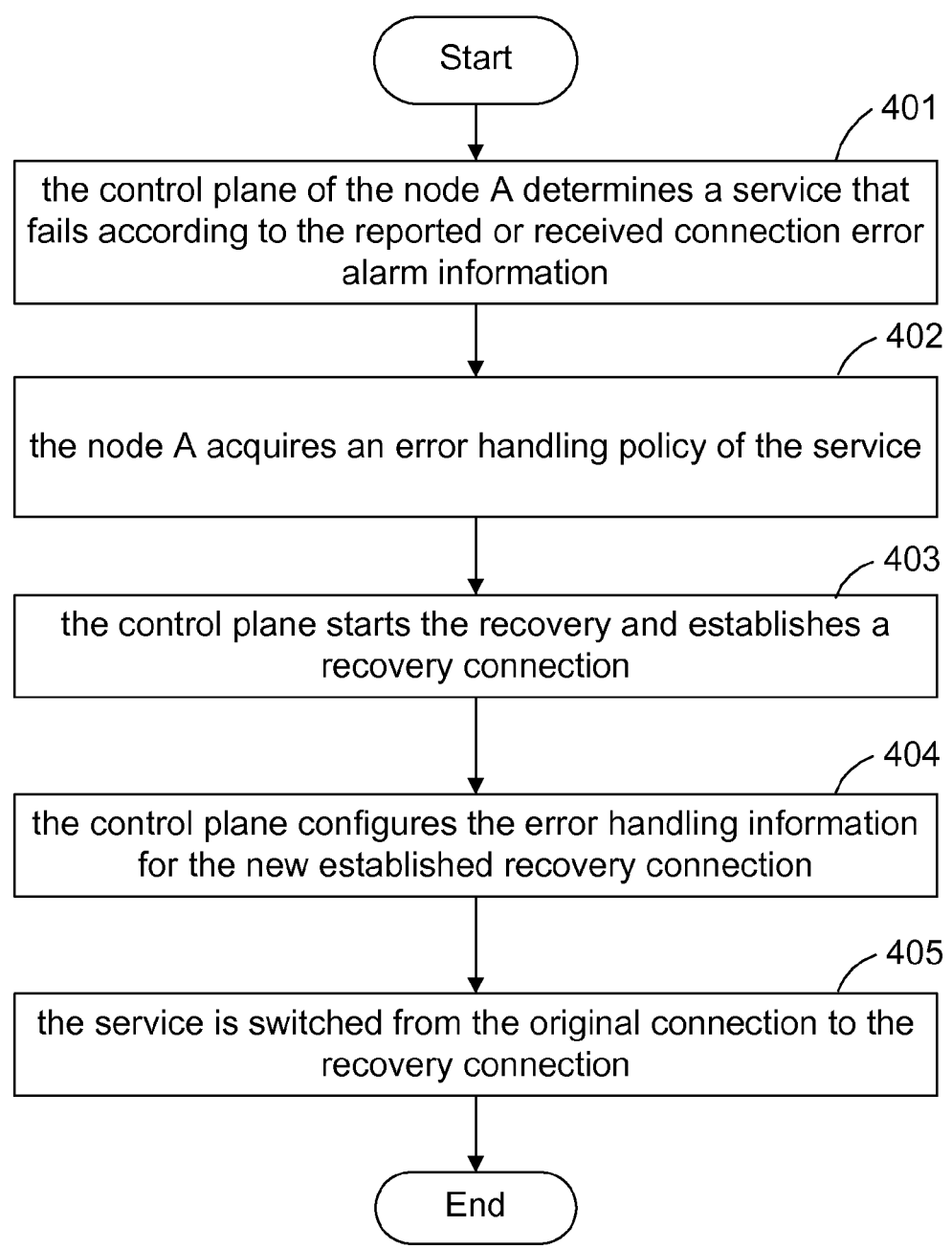
FIG. 4 shows a flow of preventing error by a control plane when an connection error occurs in the service according to Embodiment 1 of the present invention.

FIG. 2 shows a schematic diagram of establishing a recovery connection when an connection error occurs in the service according to a preferred embodiment of the present invention. Failure of a node or link in the sub-network SNC-A causes an connection error in the service. At the node Z, an connection error alarm is generated in the path of the original connection. The Node Z sends the alarm information to the node A. After the node A receives the alarm information from the node Z, the processing steps are illustrated in FIG. 4;

step 401: the node A determines the failing service according to the reported or received connection error information;

step 402: the node A acquires an error handling policy of the service in which an connection error alarm is generated;

the error handling policy of the service may be pre-configured by the control plane or a certain error handling policy dynamically selected by the control plane according to the current network state. In this embodiment, the re-routing recovery policy is used as an error handling policy, then the control plane starts the recovery;

step 403: the control plane starts the recovery and establishes a recovery connection;

as shown in FIG. 2, after the connection error occurs in the connection (A-B-D-Z), the control plane establishes the recovery connection (A-C-E-Z) according to the error handling policy;

step 404: the control plane configures the error handling information for the new established recovery connection;

Before the service is switched from the original connection to the recovery connection, the control plane of the start node and end node of the service configures the service error handling information for the new established recovery connection according to the service error handling information of the original connection;

step 405: the service is switched from the original connection to the recovery connection after the service error handling information is successfully configured;

after the service error handling information is successfully configured on both the start node and end node of the service, the control plane switches the service from the original connection (A-B-D-Z) to the recovery connection (A-C-E-Z).

If the service connection error failure of the original connection has been repaired and the node Z detects that the alarm of connection error has disappeared, the node Z sends the alarm information to the node A of the connection. After receiving the alarm information from the node Z, the node A switches the service from the recovery connection to the original connection, deletes the recovery connection, and releases the resource.

Embodiment 2

Figure 5:
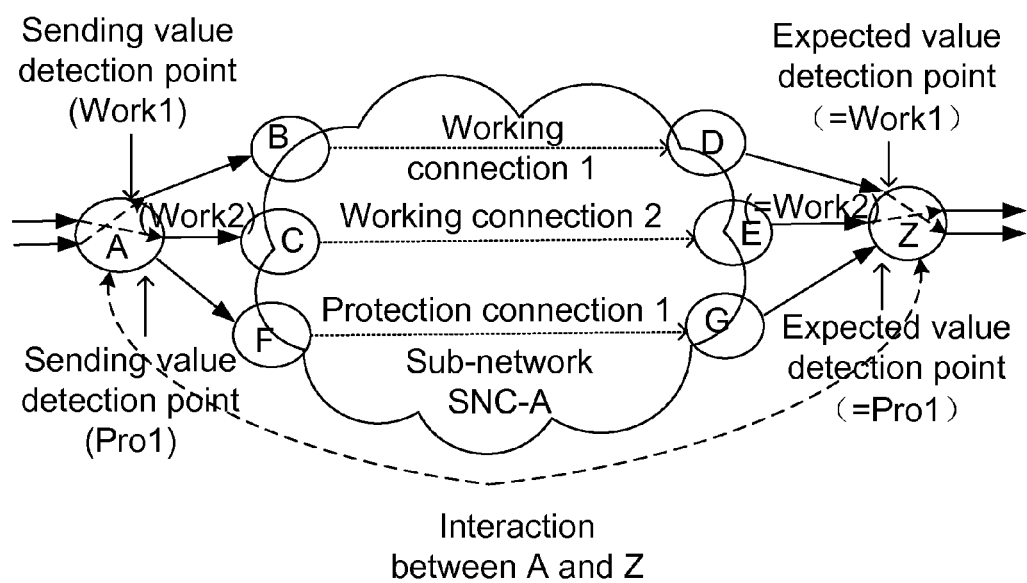
FIG. 5 shows a diagram of an application scenario of a method for connection-error handling in a normal condition according to Embodiment 2 of the present invention.

In this embodiment, the Mesh network as shown in FIG. 5 consists of network elements A, B, C, D, E, F, G, Z, and a sub-network SNC-A and the links between these nodes. The ASON control plane has successfully established the following services and connections; working connection 1; one-way service and connection A-B-D-Z; working connection 2; one-way service and connection A-C-E-Z; protection connection 1; one-way service and connection from A-F-G-Z. These three service connections form a protection group of M:N (M=1, N=2), wherein the working connections comprise the working connection 1 and working connection 2, and the protection connection comprises protection connection 1. The start node of the connection is A and the end node of the connection is Z.

The step of configuring the service error handling information for the working connection 1 by the control plane is the same as the configuration step of Embodiment 1. As shown in FIG. 3, the main steps of configuring the service error handling information comprise step 1: the sending value of the path trace byte (Jx) is set as Work1 in the sending direction of the node A;

step 2: the expected value of the path trace byte (Jx) is set as Work1 in the receiving direction of the node Z;

step 3: the service error handling information is successfully configured after the node A receives responses of successful configuration from the node A and node Z.

The interaction between the node A and node Z is performed via the DCN.

The step of configuring the service error handling information for working connection 2 by the control plane is the same as above; the only difference is that the sending value and the expected value are both set as Work2.

The step of configuring the service error handling information for protection connection 1 by the control plane is the same as above. The only difference is that the sending value and the expected value are both set as Pro1.

Figure 6:
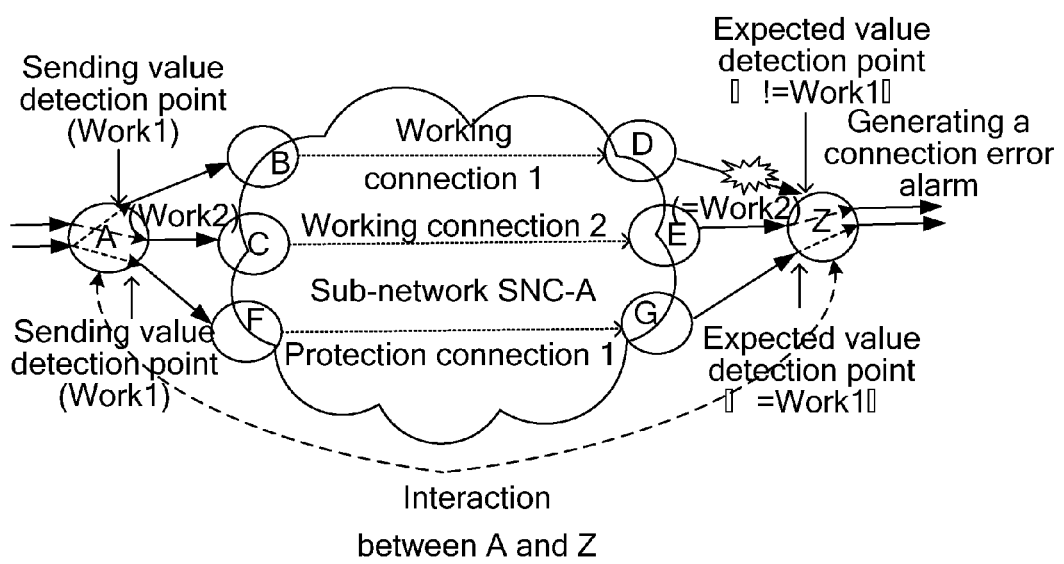
FIG. 6 shows a schematic diagram of the scenario of applying a protection switching policy when an connection error occurs in the service according to Embodiment 2 of the present invention.
Figure 7:
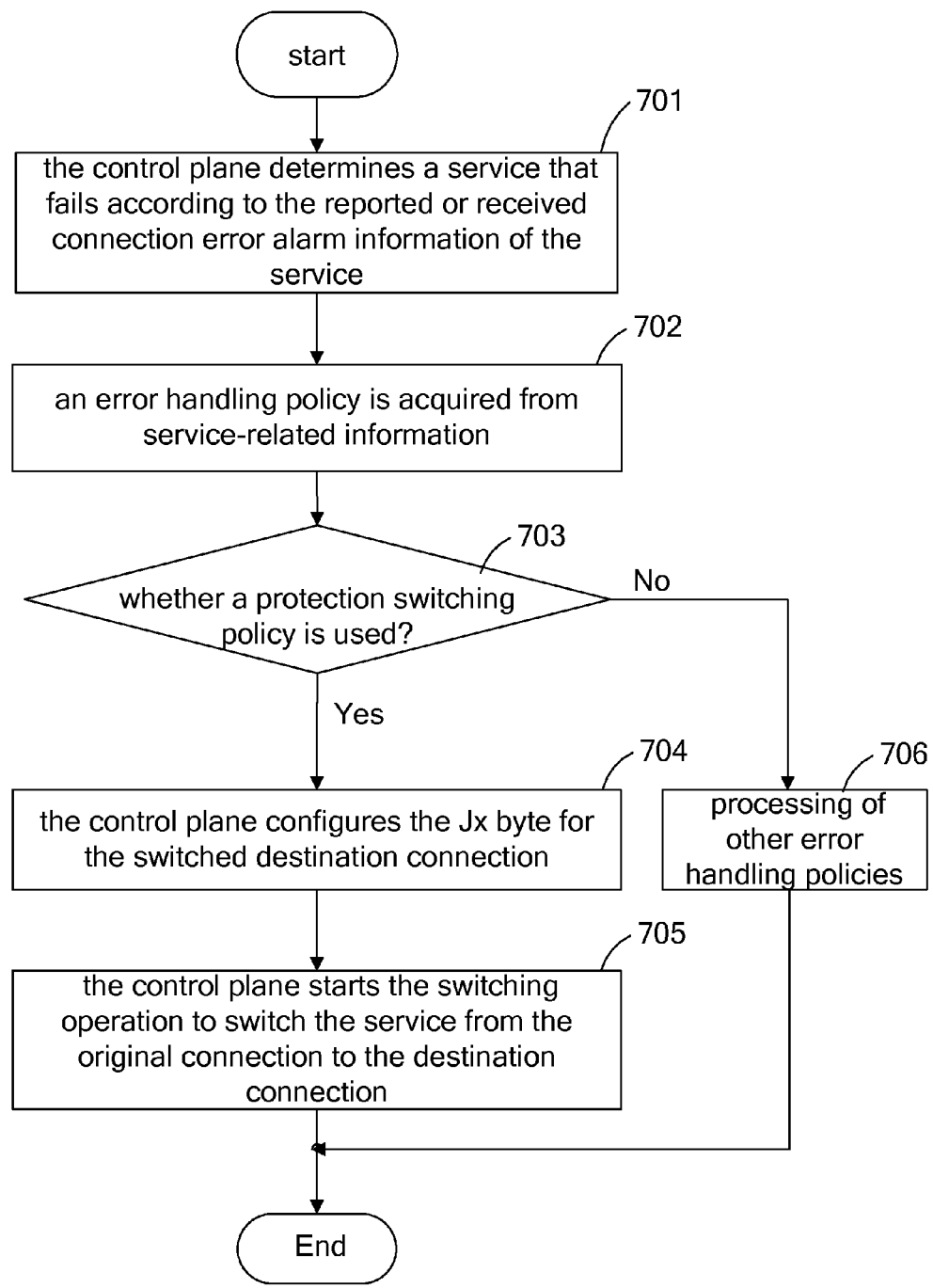
FIG. 7 shows a flow of preventing error by a control plane when an connection error occurs in the service according to Embodiment 2 of the present invention.

In this embodiment, failure of a certain node or link in the sub-network SNC-A causes an connection error in the service. At the node Z, an connection error alarm is generated in the working connection 1. As shown in FIG. 6, the node Z sends the alarm information to the node A of the connection After the node A receives the alarm information from the node Z, the processing steps are illustrated in FIG. 7:

step 701: the node A determines the failing service according to the reported or received service connection error alarm information;

step 702: the node A acquires an error handling policy of the service;

step 703: it is determined whether a protection switching policy is used; if yes, step 704 is executed; otherwise, step 706 is executed;

step 704: the control plane configures the service error handling information (Jx byte) for the switched destination connection;

the control plane starts the switching mechanism. Before the working connection 1 is switched to the protection connection 1, the control plane configures the service error handling information for the protection connection 1. The service error handling information is the service error handing information of the working connection 1;

step 705: the control plane starts, after the error handling information of the protection connection 1 is successfully configured, the switching to switch the service from the working connection 1 to the destination connection (i.e. protection connection 1);

step 706: processing of other error handling policies is performed if other error handling policies are applied.

In this embodiment, if the service connection error failure of the working connection 1 has been repaired and the node Z detects that the alarm of the connection error has disappeared, the node Z sends alarm information to the node A of the connection. The node A receives the alarm information from the node Z, the control plane switches the service from the protection connection 1 to the working connection 1 and recovers the original service error handling information.

Figure 8:
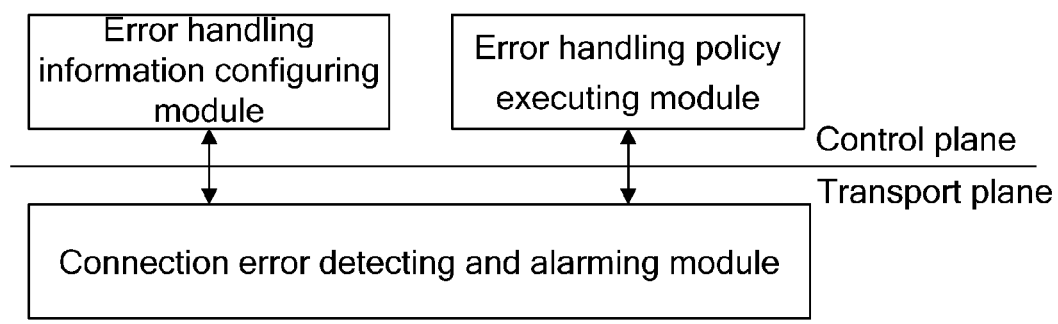
FIG. 8 shows a system structure diagram of a system for connection-error handling according to the present invention.

FIG. 8 shows a system structure diagram of a system for connection-error handling according to the present invention. The system for connection-error handling according to the present invention comprises an error handling information configuring module, an connection error detecting and alarming module and an error handling policy executing module. The error handling information configuring module and the error handling policy executing module are located in the control plane and the connection error detecting and alarming module is located in the transport plane.

The error handling information configuring module is arranged to configure service error handling information for the connection error detecting and alarming module located in the transport plane; the connection error detecting and alarming module is arranged to detect an connection error in a service according to the service error handling information configured by the error handling information configuring module, and inform, after an connection error is detected, the error handling policy executing module located in the control plane, the error handling policy executing module is arranged to acquire, after receiving connection error alarm information reported by the connection error detecting and alarming module, an error handling policy of the service in which an connection error alarm is generated and execute a corresponding error handling operation.

The error handling information configuring module further comprises a service start node error handling information configuring module arranged to configure service error handling information for the transport plane at a service start node, and a service end node error handling information configuring module arranged to configure service error handling information for the transport plane at the service end node. The service start node error handling information configuring module or the service end node error handling information configuring module, after initiating an operation of configuring the service error handling information, needs to send the service error handling information to the opposite node of the service; the opposite node of the service configures, after receiving the service error handling information, the service error handling information for the transport plane of the opposite node of the service.

Figure 9:
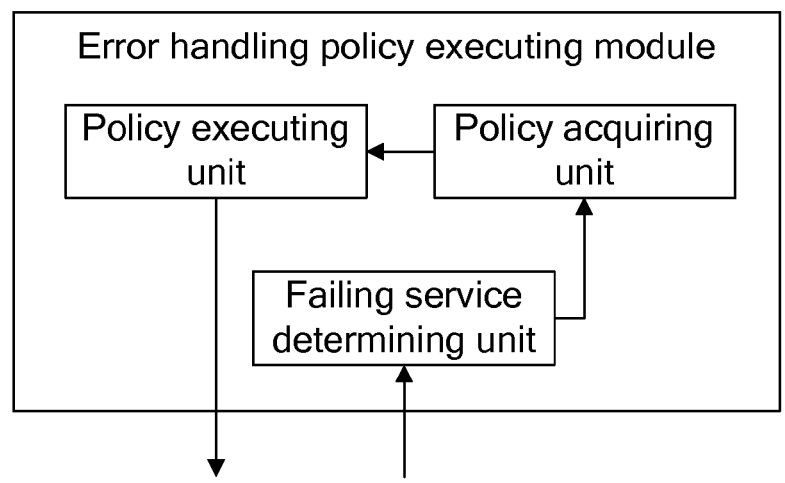
FIG. 9 shows a composite structure diagram of an error handling policy executing module in a system for connection-error handling according to the present invention.

FIG. 9 shows a composite structure diagram of an error handling policy executing module in a system for connection-error handing according to the present invention. The error handling policy executing module comprises a failing service determining unit, a policy acquiring unit and a policy executing unit.

The failing service determining unit is arranged to determine a service that fails according to the connection error alarm information of the service reported by the connection error detecting and alarming module; the policy acquiring unit is arranged to acquire an error handling policy from service-related information of the service according to the service determined by the failing service determining unit; the policy executing unit is arranged to execute a corresponding error handling operation according to the error handling policy acquired by the policy acquiring unit; the error handling policy may be a re-routing recovery policy or a protection switching policy or other error handling policies.

What are described above are only preferred embodiments of the present invention and are not intended to limit the present invention. For those skilled in the art, various modifications and changes may be made without departing from the principles of the present invention. These modifications and changes should be included in the protection scope of the present invention.

The invention claimed is:

1. A method for connection-error handling of service in an Automatically Switched Optical Network (ASON), comprising:
   A: a control plane configuring service error handling information for a transport plane;
   B: the transport plane reporting connection error alarm information to the control plane after detecting a connection error according to the service error handling information;
   C: the control plane acquiring, after receiving the connection error alarm information, an error handling policy of a service in which a connection error alarm is generated, and performing a corresponding error handling operation;
   wherein the service error handling information refers to a path trace byte, the control plane setting a sending value and an expected value when configuring the path trace byte, comprising:
   for a one-way service, the sending value is set in a sending direction of the start node of the service, and the expected value is set in a receiving direction of the end node of the service; where, the sending value is the same as the expected value;
   for a two-way service, the sending value is set in the sending directions of the start node and the end node of the service; the expected value is set in the receiving directions of the start node and the end node of the service; where, the sending value is the same as the expected value.

2. The method according to claim 1, wherein in the step A, the step that the control plane configures the service error handling information for the transport plane comprises:
   A1: the control plane of a start node or an end node of a service issuing a configuration request to the transport plane of the corresponding node after acquiring the service error handling information;
   A2: the start node or the end node of the service that initiates an operation of configuring service error handling information sending the service error handling information to an opposite node of the service;
   A3: the opposite node of the service issuing a configuration request to the transport plane of the opposite node of the service after receiving the service error handling information;
   A4: the start node and end node of the service, after being successfully configured with the service error handling information, reporting configuration success messages to the control plane.

3. The method according to claim 1, wherein the start node or the end node of the service that initiates configuration of the service error handling information uses a Notify message in a Resource ReSerVation Protocol (RSVP) or an Original Equipment Manufacture (OEM) message in a Link Management Protocol (LMP) to bear the service error handling information and send the message to the opposite node of the service.

4. The method according to claim 1, wherein the error handling policy is a re-routing recovery policy, and the step C specifically comprises:
C11: the control plane searches for a service in which a connection error alarm is generated, according to the connection error alarm information reported by the transport plane;
C12: the control plane acquires the error handling policy of the service in which the connection error alarm is generated and establishes a recovery connection;
C13: the control plane configures the service error handling information for the transport plane on the recovery connection according to the service error handling information of an original connection;
C14: the service in which the connection error alarm is generated is switched from the original connection to the recovery connection after the error handling information of the recovery connection is successfully configured.

5. The method according to claim 1, wherein the error handling policy is a protection switching policy, and the step C specifically comprises:
C21: the control plane searches for a service in which a connection error alarm is generated according to the connection error alarm information reported by the transport plane, and determines a destination connection to which the service needs to be switched to;
C22: the control plane acquires the error handling policy of the service in which the connection error alarm is generated;
C23: the control plane configures the service error handling information of the original connection on the destination connection;
C24: the service in which the connection error alarm is generated is switched from the original connection to the destination connection after the error handling information of the destination connection is successfully configured.

6. An Automatically Switched Optical Network (ASON) including a system for connection-error handling of service, comprising:
an error handling information configuring module, arranged to configure service error handling information for a connection error detecting and alarming module located in a transport plane;
the connection error detecting and alarming module, arranged to detect a connection error in a service according to the service error handling information configured by the error handling information configuring module, and inform, after a connection error is detected, an error handling policy executing module located in a control plane;
the error handling policy executing module, arranged to acquire, after receiving connection error alarm information reported by the connection error detecting and alarming module, an error handling policy of the service in which a connection error alarm is generated and execute a corresponding error handling operation;
wherein the error handling information configuring module, the connection error detecting and alarming module and the error handling policy executing module are included in the ASON, and
wherein the service error handling information refers to a path trace byte, the control plane, when configuring the path trace byte, needs to set a sending value in the sending directions of the start node and the end node of the service and set an expected value in the receiving directions;
the start node or the end node of the service that initiates configuration of the service error handling information uses a Notify message in a Resource ReSerVation Protocol (RSVP), or an Original Equipment Manufacture (OEM) message in a Link Management Protocol (LMP) to bear the service error handling information and send the message to the opposite node of the service.

7. The ASON according to claim 6, wherein the error handling information configuring module is located in the control plane and comprises:
a service start node error handling information configuring module, arranged to configure service error handling information for the transport plane at a service start node;
a service end node error handling information configuring module, arranged to configure service error handling information for the transport plane at the service end node;
the service start node error handling information configuring module or the service end node error handling information configuring module, after initiating an operation of configuring service error handling information, needs to send the service error handling information to an opposite node of the service, and the opposite node of the service, after receiving the service error handling information, configures the service error handling information for the transport plane of the opposite node of the service.

8. The ASON according to claim 6, wherein the error handling policy executing module comprises:
a failing service determining unit, arranged to determine a service that fails according to the connection error alarm information of the service reported by the connection error detecting and alarming module;
a policy acquiring unit, arranged to acquire an error handling policy from service-related information of the service according to the service determined by the failing service determining unit;
a policy executing unit, arranged to execute a corresponding error handling operation according to the error handling policy acquired by the policy acquiring unit;
the error handling policy is a re-routing recovery policy or a protection switching policy.

* * * * *